US012743559B2

(12) United States Patent
Christianson et al.

(10) Patent No.: US 12,743,559 B2
(45) Date of Patent: Sep. 22, 2026

(54) TAMPER PROOF TRANSPORTATION DEVICE

(71) Applicant: UNIVERSITY OF HERTFORDSHIRE HIGHER EDUCATION CORPORATION, Hatfield (GB)

(72) Inventors: Donald Bruce Christianson, Hatfield (GB); Alexander Shafarenko, Hatfield (GB)

(73) Assignee: UNIVERSITY OF HERTFORDSHIRE HIGHER EDUCATION CORPORATION, Hatfield (GB)

( * ) Notice: Subject to any disclaimer, the term of this patent is extended or adjusted under 35 U.S.C. 154(b) by 293 days.

(21) Appl. No.: 18/042,284

(22) PCT Filed: Aug. 19, 2021

(86) PCT No.: PCT/GB2021/052153
§ 371 (c)(1),
(2) Date: Feb. 20, 2023

(87) PCT Pub. No.: WO2022/038360
PCT Pub. Date: Feb. 24, 2022

(65) Prior Publication Data
US 2023/0325542 A1 Oct. 12, 2023

(30) Foreign Application Priority Data
Aug. 20, 2020 (GB) ..................................... 2013018

(51) Int. Cl.
*G06F 21/86* (2013.01)
*G06F 21/79* (2013.01)

(52) U.S. Cl.
CPC .............. *G06F 21/86* (2013.01); *G06F 21/79* (2013.01); *G06F 2221/2103* (2013.01); *G06F 2221/2143* (2013.01)

(58) Field of Classification Search
None
See application file for complete search history.

(56) References Cited

U.S. PATENT DOCUMENTS 4,449,631 A 5/1984 Levenberg et al.
5,108,194 A 4/1992 Raden
(Continued)

FOREIGN PATENT DOCUMENTS

JP 2020144854 A * 9/2020 ............ G06F 21/71
KR 20190069691 A * 6/2019 ............ G11C 15/04
(Continued)

OTHER PUBLICATIONS

Hu, Y. C., Lo, C. C., Wu, C. M., Chen, W. L., & Wen, C. H. (2013). Probability-based tamper detection scheme for BTC-compressed images based on quantization levels modification. International Journal of Security and Its Applications, 7(3), 11-32. (Year: 2013).*
(Continued)

*Primary Examiner* — Jorge L Ortiz Criado
*Assistant Examiner* — Miguel Alexander Lopez
(74) *Attorney, Agent, or Firm* — Conley Rose, P.C.

(57) ABSTRACT

This invention provides a probabilistically digital tamper proof container for data, a method for loading the data onto the container and a method for subsequently reading the data from the container whilst simultaneously verifying that the data loaded onto the container hasn't been read previously.

20 Claims, 3 Drawing Sheets

(56) References Cited

U.S. PATENT DOCUMENTS

| | | | | |
|---|---|---|---|---|
| 5,631,068 | A | 5/1997 | Smith | |
| 5,788,377 | A | 8/1998 | Vetter | |
| 5,918,983 | A | 7/1999 | Palazzolo | |
| 8,981,810 | B1 * | 3/2015 | Trimberger | H03K 19/003 326/8 |
| 9,947,391 | B1 * | 4/2018 | Mahatme | G11C 11/419 |
| 10,152,613 | B2 * | 12/2018 | Kwong | G11C 11/419 |
| 10,536,281 | B2 * | 1/2020 | Das | G11C 11/15 |
| 10,630,492 | B2 * | 4/2020 | Guilley | G09C 1/00 |
| 2002/0105452 | A1 * | 8/2002 | Clapp | H03M 1/108 341/144 |
| 2003/0051148 | A1 * | 3/2003 | Garney | G06F 21/79 713/189 |
| 2005/0036716 | A1 | 2/2005 | Geyer | |
| 2008/0162869 | A1 * | 7/2008 | Kim | G06F 12/0893 711/216 |
| 2009/0143048 | A1 | 6/2009 | Ayanamcottil et al. | |
| 2009/0157948 | A1 * | 6/2009 | Trichina | G06F 12/0246 711/E12.001 |
| 2014/0201851 | A1 * | 7/2014 | Guo | G09C 1/00 726/34 |
| 2017/0214532 | A1 * | 7/2017 | Das | G11C 16/20 |
| 2017/0295026 | A1 * | 10/2017 | Guilley | G06F 11/263 |
| 2018/0131527 | A1 * | 5/2018 | Lu | H04L 9/3278 |
| 2018/0173900 | A1 * | 6/2018 | Kwong | G09C 1/00 |
| 2018/0191512 | A1 * | 7/2018 | Tomishima | G09C 1/00 |
| 2019/0190725 | A1 * | 6/2019 | De | G09C 1/00 |
| 2020/0228512 | A1 * | 7/2020 | Ateniese | H04L 9/0637 |
| 2020/0243122 | A1 * | 7/2020 | Mahatme | G11C 7/062 |
| 2021/0366568 | A1 * | 11/2021 | Yen | G11C 29/785 |
| 2022/0029834 | A1 * | 1/2022 | Hoefler | H04L 9/3278 |
| 2022/0046114 | A1 * | 2/2022 | Entelis | H04L 69/04 |
| 2023/0325542 | A1 * | 10/2023 | Christianson | H04L 9/002 726/34 |

FOREIGN PATENT DOCUMENTS

| | | | | |
|---|---|---|---|---|
| WO | 03023578 | A2 | 3/2003 | |
| WO | 2014178889 | A1 | 11/2014 | |
| WO | 2017030805 | A1 | 2/2017 | |
| WO | WO-2017027762 | A1 * | 2/2017 | G11C 13/0059 |
| WO | 2018175973 | A1 | 9/2018 | |
| WO | 2022038360 | A1 | 2/2022 | |

OTHER PUBLICATIONS

Yanambaka, Venkata Prasanth & Mohanty, Saraju & Kougianos, Elias. (2018). Making Use of Manufacturing Process Variations: A Dopingless Transistor Based-PUF for Hardware-Assisted Security. IEEE Transactions on Semiconductor Manufacturing. pp. 1-1. 10.1109/TSM.2018.2818180. (Year: 2018).*

Keonsoo Ha, et. al., 2013. A read-disturb management technique for high-density NAND flash memory. In Proceedings of the 4th Asia-Pacific Workshop on Systems (APSys '13). Association for Computing Machinery, New York, NY, USA, Article 13, 1â6. https://doi.org/10.1145/2500727.2500743 (Year: 2013).*

Y. Cai, et al., "Data retention in MLC NAND flash memory: Characterization, optimization, and recovery," 2015 IEEE 21st International Symposium on High Performance Computer Architecture (HPCA), Burlingame, CA, USA, 2015, pp. 551-563, doi: 10.1109/HPCA.2015.7056062. (Year: 2015).*

Foreign Communication from a Related Counterpart Application, International Search Report and Written Opinion dated Nov. 23, 2021, International Application No. PCT/GB2021/052153 filed on Aug. 19, 2021.

Foreign Communication from a Related Counterpart Application, United Kingdom Combined Search and Examination Report dated Dec. 30, 2020, United Kingdom Application No. 2013018.3 filed on Aug. 20, 2020.

Foreign Communication from a Related Counterpart Application, United Kingdom Examination Report dated Jul. 18, 2022, United Kingdom Application No. 2013018.3 filed on Aug. 20, 2020.

* cited by examiner

TAMPER PROOF TRANSPORTATION DEVICE

CROSS-REFERENCE TO RELATED APPLICATIONS

The present application is a filing under 35 U.S.C. 371 as the National Stage of International Application No. PCT/GB2021/052153, filed Aug. 19, 2021, entitled "DESTRUCTIVE READ MEMORY BASED TAMPER EVIDENT CONTAINER; VERIFICATION METHOD THEREFOR," which claims priority to United Kingdom Application No. 2013018.3 filed with the Intellectual Property Office of The United Kingdom on Aug. 20, 2020, both of which are incorporated herein by reference in their entirety for all purposes.

FIELD OF THE INVENTION

This invention relates to a probabilistically digital tamper proof container for data, a method for loading the data onto the container and a method for subsequently reading the data from the container whilst simultaneously verifying that the data loaded onto the container hasn't been read previously.

BACKGROUND OF THE INVENTION

Movement of a secret from one physical location to another is the most exposed period in the lifetime of any confidential information. It is then that confidentiality is most at risk. Stationary defenses, such as physical doors under lock and key, surveillance cameras, security guards and other forms of physical access control are greatly diminished in effectiveness when the container that carries a secret is in transit outside the security perimeter of the principals committed to preserving its confidentiality.

Physical protection of moving secrets has not changed much over centuries. What has changed is the relative importance of tamper evident compared to tamper proof protection. The reason for that is that the content physically transported from place to place nowadays tends to be random digital data, which are of zero value if stolen, unless it is copied in a way that leaves the sender and recipient unaware that the copying has taken place. Once the absence of copy-access to the data can be ascertained reliably by examination at an affordable cost, the actual secret information can be sent over open channels in digital form using that data as a key for strong symmetric encryption. At present time, breaking such encryption is incomparably more time-consuming and expensive than breaking any physical hard shell whatsoever in which content can be carried between principals.

That circumstance notwithstanding, high-security tamper evident packaging is very much in demand, and it still relies, as it has done for centuries, on a physical shell manufactured to be as shatterable and unclonable as possible. The former property means that if the shell is penetrated to access the content, it becomes conspicuously broken, i.e. "shatters", and the latter signifies that a shattered shell cannot be replaced by a clone, i.e. a counterfeit copy of the original shell, unnoticeably.

There is a third factor that in practical situations is relied upon even more heavily than the two aforementioned technological ones: transport security. Packages are transported by a courier, an armed guard if need be, and the courier is trusted to prevent any access to the package while it is in transit.

None of the three factors provide security anywhere near as strong as the security of cryptographic procedures performed automatically by machines. Perhaps the greatest vulnerability of all is that it is rarely possible for the recipient themselves to determine the authenticity of the shell and whether or not it has been broken with 100% certainty. Since retrieving the message necessitates breaking the shell anyway, post hoc auditing of the protocol is difficult: if the package shatters well, it may not be possible to determine that the shell had already been broken at the time the recipient made the determination that it was intact and broke it to retrieve the message.

Authenticity of the shell requires expert investigation, which cannot be assumed to be within the recipient's technological capacity—they could be an embassy, a legal office or any other unit without expert knowledge of counterfeit techniques. When the recipient engages a non-local expert, they expose themselves to a simple insider attack whereby the original package is intercepted by a compromised insider, broken into, read, and then repackaged into an imperfectly cloned shell, good enough to convince the non-expert legitimate recipient. The broken counterfeit shell is subsequently intercepted on its way out to the expert and replaced by the original broken shell by the same compromised insider. In this scenario the insider, if they succeed in convincing the legitimate recipient, are not vulnerable to post hoc detection at all.

Publicly available tamper proof-shell technologies are exemplified by patents below.

U.S. Pat. No. 5,918,983 (CONTROL PAPER CO INC) describes a security envelope for transporting valuable documents and articles which includes a thin header formed of thin frangible material secured to the back panel having an adhesive layer that seals the header to the front panel upon folding and pressing closed. An inner layer of adhesive on the inner surface of the back panel seals the inner front and back panel surfaces to close the envelope chamber and extends further toward the envelope bottom than the header adhesive layer when sealed to prevent tampering tool access to the envelope chamber. Application of tampering heat will shrivel the header and cold sufficient to release the inner adhesive layer will cause pieces of the outer adhesive layer to break off and fall away. Printed indicia on the header inner surface and a transparent flood coat on the inner header surface will adhere to the header adhesive layer and aid in the tampering attempt indication.

U.S. Pat. No. 5,788,377 (UNIFLEX) describes a tamper-resistant envelope which includes first and second panels joined to one another to define opposed side edges and a bottom edge of the envelope. Each of the panels have an upper edge which together define an opening opposite the bottom edge of the envelope for providing access into the envelope. The upper edge of the second panel extends beyond the upper edge of the first panel to define a panel extension. A layer of adhesive sealant material is disposed on an interior surface of the first panel adjacent the upper edge thereof for sealingly adhering to an interior surface of the second panel. The sealant material has adherent properties which are resistant to release at temperatures substantially below room temperature. The envelope also includes an adhesive sealing strip having a lower portion mounted to an exterior surface of the first panel and an upper portion positioned to sealingly adhere to the panel extension of the second panel.

U.S. Pat. No. 5,108,194 (RADEN DAVID T) describes a closure system for a plastic security bag comprises an access opening with an adhesive laden cellophane carrier film regulating access thereto. The film is affixed to the bag below the lower edge of the access opening and has a band of "hot melt" there along. Upon removal of the releasable liner the carrier film is positioned such that the "hot melt" spans the access opening and closes the same. Lacquer coating at the ends of the opening preclude undesirable sticking of the releasable liner to the security bag. The ends of the access opening are "heat sealed" and cooperate with the adhesive to preclude leakage of liquid through the closed opening. Entry of the bag is accomplished by tearing the carrier film and/or bag proper which is evident to an observer.

US20050036716 (AMPAC PLASTICS LLC) describes a security bag which has tamper indicating features that may be incorporated directly on the bag during manufacture, without requiring conventional tamper-indicating tapes. Release material is selectively applied to the bag in the form of a pattern or void message, prior to treatment of the bag to improve ink-retaining characteristics. After treatment, an ink layer is applied over the release material. An adhesive layer is applied to the bag in an area that will seal an opening of the bag and contact the ink layer at least when the bag is sealed. When the bag is reopened after initial sealing, portions of the ink layer applied over the release material will be retained with the adhesive, while the remainder of the ink layer will be retained on the treated surface of the bag.

U.S. Pat. No. 5,631,068 (TRIGON PACKAGING CORP) describes a tape or label for sealing a container that provides visual evidence if the seal is forced open or cooled below a breakdown temperature. The tape includes a plastic strip, a layer of ink printed on a surface of the plastic strip, and a layer of pressure-sensitive adhesive. The tape can be incorporated into a bag for sealing the bag closed. The tape includes an ink layer that is sandwiched between the plastic strip and the adhesive layer. The adhesive can be secured to portions of a bag to seal it closed. If the seal is forced open, the ink layer visibly delaminates from the plastic strip. The adhesive layer and the plastic strip are chosen to have different rates of shrinking when cooled, so that when the tape is cooled below its breakdown temperature, the ink layer delaminates. In an alternative embodiment of the tape, two layers of ink are printed onto the plastic strip. The first layer of ink is clear and is printed onto the untreated plastic strip in a pattern. The second layer of ink is opaque and is printed uniformly over the plastic strip and the clear ink after the plastic strip is treated.

U.S. Pat. No. 4,449,631 (LEVENBERG ALVIN; LEVENBERG NAT) describes a sealable package for pharmaceutical and other products which will immediately reveal the presence of tampering. The package consists of a sealed envelope of thermoplastic film having a printed outline in which the sealing of the package is performed at the printed outline. After sealing, the film is shrunk tending to inflate the sealed area because of entrapped air. Should the package be ruptured the inflation is lost. Should the package be cut at the sealed area, it is impossible to reseal the package without a visual indication caused by irregularities in the printed area.

If a secret is digital, it still requires a physical container/conduit that is opaque to any information reader until it is unlocked by an authorised recipient. If the container is a communication line, the secret usually has to be encrypted to prevent eavesdropping on the line. This does not solve the problem because now another secret, which is the encryption key, has to be communicated to the recipient, which, again, requires a further encryption, etc. Public key cryptography is currently the best solution ensuring that secrets do not have to travel, but it is generally vulnerable to quantum computing attacks.

SUMMARY OF THE INVENTION

According to a first aspect of the present invention there is provided a tamper evident container comprising one or more Destructive Read Memory (DeRM) elements configured to store content, wherein each of the one or more DeRM elements are configured such that the content stored by each of the one or more DeRM elements is greater than the content revealed when each of the one or more DeRM elements are destructively read. This configuration means an interceptor cannot read any significant part of the content of the container without destroying more of the content than the reading reveals. Restoring the content to the previous state requires knowledge of all the destroyed content, including that which was not revealed.

A Destructive Read Memory (DeRM) element is one where the process of reading the memory causes the contents of the memory to be destroyed. It is possible to provide a write-back mechanism for a DeRM element wherein if it is determined that continued access to acquired data is allowed, then the write-back mechanism writes back the data as it is destructively read from the memory, in this case a write-back mechanism is preferably not provided.

The present invention provides a fully digital tamper-evident technology, which may in one embodiment be microelectronic in the form of a memory chip in which individual bits of data are protected from being read whereby the act of an interceptor reading any significant number of bits leaves a noticeable trace. Unclonability and shatterability are thus achieved on the nanometre scale. This allows the technology provider to exclude human elements from all protocols and place the security perimeter around the machines that write messages into such chips or read and validate data they contain.

Preferably the container comprises a physical container. The container may be electronics based, optics based, chemistry based or micromechanics based. Preferably the container comprises a physical container that holds digital data within the container.

Preferably the container comprises storage capacity sufficient for practical purposes, for example this may range from several Megabytes to more than one Terabyte, and is preferably arranged in such a way, that makes it unfeasible or uneconomic to obtain access to all or nearly all individual storage elements other than via the erase and challenge mechanisms set out below.

Preferably the container is configured to carry or transport digital data between a sender and a recipient.

Preferably the container comprises an array of a plurality of DeRM elements.

Preferably each of the one or more DeRM elements comprises one or more DeRM cells.

Preferably each of the one or more DeRM elements comprises a plurality of DeRM cells.

In one alternative each of the one or more DeRM elements comprises three DeRM cells.

In one alternative each of the one or more DeRM elements comprises three or more DeRM cells.

In one alternative each of the one or more DeRM elements comprises four DeRM cells.

Preferably each of the one or more DeRM elements is configured to be erased, preferably either only during manufacture or repeatedly by its users. In the former case the container can be used to convey a secret only once.

Preferably each of the one or more DeRM elements is configured to be challenged.

Preferably each of the one or more DeRM elements is configured to be challenged by supplying to the container the address of each of the one or more DeRM elements and (for each address) a digital value from a limited value set.

Preferably each of the one or more DeRM elements is configured to be challenged by supplying to the container the address of each of the one or more DeRM elements and for each address a digital value from a limited value set.

Preferably the address is in the same form used with conventional memory.

Preferably in the case where each DeRM elements comprises three DeRM cells the limited value set comprises 110, 101, 011.

Preferably each of the one of more DeRM elements comprises an encoder and an aggregator.

Preferably the encoder is arranged to transform a 2-bit challenge code into a 3-bit challenge chosen from the limited value set where the DeRM element comprises three DeRM cells.

Preferably the encoder is arranged to transform a 3-bit challenge code into a 4-bit challenge chosen from the limited value set where the DeRM element comprises four DeRM cells.

Preferably the aggregator is arranged to allow for a single output from the DeRM element.

Preferably the container has a clock signal and the challenge is sensed at an edge of the clock signal.

The challenge preferably causes each of the one or more DeRM elements to perform two actions at the same time:

a. modify the content of the DeRM element based on the content of the DeRM element and the challenge value; and b. output a 1-bit signal response indicating whether or not the new content is different in some way from the one that was there before the modification.

wherein if the response indicates that the new content is different, this is a differ (1) response, otherwise the response is a match (0).

In this way there is an output of each of the one or more DeRM elements.

Preferably the challenge causes each of the one or more DeRM elements itself, rather than any interface outside each of the one or more DeRM elements, to perform the two actions at the same time.

Preferably each of the one or more DeRM elements is configured to have valid content written into it by challenging the DeRM element with a part or all of the content to be written.

In one alternative each of the one or more DeRM elements is configured to have valid content written into it by repeatedly challenging the DeRM element with a part or all of the content to be written until all of the content has been written.

In one alternative prior to challenging the DeRM element with a part or all of the content to be written the DeRM element is erased. In another alterative the DeRM element has already been erased during manufacture and cannot be erased again.

Preferably each of the one or more DeRM elements is configured to have valid content written into it by performing the following steps:

1. erasing the DeRM element (unless the element has been erased during manufacture and cannot be erased again); and then optionally
2. challenging the DeRM element with a part or all of the content to be written; and then optionally
3. repeating step 2.

Preferably each of the one or more DeRM elements are configured that the content of the DeRM element cannot be read other than by challenging it, for example preferably each of the one or more DeRM elements are configured that the content of the DeRM element cannot be read by tampering with the container's interface.

Preferably each of the one or more DeRM elements are configured to output the one-bit match/differ response only when challenged.

Preferably each of the one or more DeRM elements are configured to output no information when challenged other than the one-bit match/differ response.

Preferably each of the one or more DeRM elements are configured to contain more information than the response to an arbitrary challenge will yield, preferably the additional information is irreversibly destroyed for at least one challenge value; which challenge values cause such information loss preferably depends on the content stored in the challenged DeRM element. For example in the case where each DeRM element comprises three DeRM cells, challenging the content 011 with the challenge 011 (leading to a "match" response) will not cause any state change, or information loss, whereas challenging the content 011 with the challenge 110 will cause the content to transition to 111 (leading to a "differ" response), and will thus destroy the information that the initial content was 011 and not 101.

Preferably when each of the one or more DeRM elements comprises a plurality of DeRM cells the destructive read may reveal that one of the DeRM cells of which the DeRM element is comprised has changed state, but not disclose which DeRM cell this was.

Preferably each of the one or more DeRM elements are configured such that any challenge value that causes a differ response destroys some information in the process. Consequently retrieval of the content of each of the one or more DeRM elements preferably requires the recipient to obtain, before any of the one or more DeRM elements are challenged, additional information to substitute for the information that will be destroyed by the challenge. This additional information is referred to as the information deficit.

For example, if in a particular embodiment a DeRM element contains the value 110, 101, or 011, if one were to challenge with the value 110, a differ response will not indicate whether the DeRM element content was 101 or 011, and the previous content is destroyed by the challenge and so cannot be challenged again. However if, before issuing the challenge, the recipient were publicly informed by the writer that the content is either 110 or 011, then a challenge, either with 110 or with 011, will reveal the correct content to the recipient, but not to a third party.

A further consequence of the combination of destructive read and information deficit is that physical intervention in the container to read the contained data and copy it to an identical container is rendered ineffective unless the intrusion can isolate, and measure the state of, all or nearly all individual memory elements (bits) comprising the one or more DeRM cells of the container by placing signal probes directly on the physical storage elements with feature-size accuracy This enables the container to be mass-produced because it does not need to be individualised for the purposes of evidence of tamper detection.

According to a second aspect of the present invention there is provided a method of loading data onto the container of the first aspect of the present invention, preferably by challenging each of the DeRM elements with a part or all of the content to be written.

In one alternative each of the one or more DeRM elements is configured to have valid content written into it by repeatedly challenging each of the DeRM elements with a part or all of the content to be written until all of the content has been written.

In one alternative prior to challenging each of the DeRM elements with a part or all of the content to be written the DeRM element is erased. In another alterative each of the DeRM elements have already been erased during manufactures and cannot be erased again.

In one alternative the method of loading data onto the container comprises performing successively to each of the one or more DeRM elements the following steps:

1. erasing the DeRM element (unless the element has been erased during manufacture and cannot be erased again); and then optionally
2. challenging the DeRM element with a part or all of the content to be written; and then optionally
3. repeating step 2.

Preferably each of the one or more DeRM elements are challenged by supplying to the container the address of each of the one or more DeRM elements and (for each address) a digital value from a limited value set.

Preferably each of the one or more DeRM elements are challenged by supplying to the container the address of each of the one or more DeRM elements and for each address a digital value from a limited value set.

Preferably the address is in the same form used with conventional memory.

Preferably in the case where each of the one or more DeRM elements comprises three DeRM cells the limited value set comprises 110, 101, 011.

Preferably the container has a clock signal and the challenge is sensed at an edge of the clock signal.

The challenge preferably causes each of the one or more DeRM elements to perform two actions at the same time:

a. modify the content of the DeRM element based on the content of the DeRM element and the challenge value; and
b. output a 1-bit signal response indicating whether or not the new content is different in some way from the one that was there before the modification.

wherein if the response indicates that the new content is different, this is a differ (1) response, otherwise the response is a match (0).

In this way there is an output of each of the one or more DeRM elements.

Preferably the challenge causes each of the one or more DeRM elements itself, rather than any interface outside each of the one or more DeRM elements, to perform the two actions at the same time.

Preferably the method of loading the data onto the container facilitates the conveyance of a secret bit string from a sender to a recipient via the following steps:

1. augmenting the secret bit string with random filler equal (in information theoretic terms) to the information deficit;
2. The sender sending to the recipient over a side channel information about which of the possible challenges will reveal the secret bit string and destroy the filler (rather than destroying some of the information in the secret bit string).

In a specific embodiment of the invention the method of loading data onto the container may comprise the steps set out in the procedures CFP1 or CFP2 set out below in the case where each of the one or more DeRM element comprises three DeRM cells.

Container Filling Procedure CFP1

1. Before writing, the sender nominates a private excluded value: 011, 101 or 110, for each of the DeRM elements it is about to fill. The excluded value is selected at random, and the sender records its choice in some persistent storage within the sender's security perimeter. This value is excluded from the choice of values to be written into the corresponding DeRM element, leaving the other two information-bearing values as the only choices. The confidentiality of the excluded value (s) is critical for the security properties of the proposed method, since it is the fact that they are unknown to any interceptor (as well as the legitimate recipient prior to the information release) that creates a sufficient information deficit that makes the secret in the DeRM container unreadable.
2. The content to be stored in the container is a sequence of binary values encoded in triplet form. The binary values form part of a secret bit string that is private, persistent, and stored within the sender's security perimeter, and are never communicated in their original form. In one possible embodiment, the correspondence between triplet and binary values is established using a priority encoding rule: 011<101<110: whichever triplet is excluded, the lower remaining one becomes the encoding for value "0" and the higher remaining one for "1". This way the sender and the recipient have a consistent interpretation of the content when the excluded value is known. The sender encodes the content accordingly, and stores it in a temporary file, which is destroyed after completing CFP1. In another possible embodiment the correspondence between triplet and binary values is established using a cyclic encoding rule: 011→101→110→011: whichever triplet is excluded, the next triplet in the cycle becomes the encoding for value "0" and the previous triplet in the cycle becomes the encoding value for "1".
3. When the content has been encoded, the container is erased (unless the element has been erased during manufacture and cannot be erased again) and the encoded sequence of triplets is presented to it as challenges, which effectively copies the sequence to the consecutive addresses of the DeRM container.

Container Filling Procedure CFP2

1. Before writing, the sender nominates a private encoded value: 011, 101 or 110, for each of the DeRM elements it is about to fill. The encoded value is selected at random, and the sender records its choice in some persistent storage within the sender's security perimeter. The confidentiality of the encoded values is critical for the security properties of the proposed method.
2. When the encoded values have been chosen, the container is erased (unless the element has been erased during manufacture and cannot be erased again) and the sequence of encoded values is presented to it as challenges, which effectively copies the sequence to the consecutive addresses of the DeRM container.
3. The content to be released by the container is a sequence of binary values. The binary values form part of a secret bit string that is private, persistent, and stored within the sender's security perimeter, and are never communicated in their original form. It is possible that these values are not chosen by the sender until after receipt of the container has been confirmed by the recipient, for example by using the side channel. For each binary value to be released, an excluded triplet value is chosen depending on the encoded value. In one possible embodiment the correspondence between triplet and binary values is established using a cyclic encoding rule: 011→101→110→011: whichever triplet is encoded, the next triplet in the cycle becomes the excluded value for releasing the binary value "1" and the previous triplet in the cycle becomes the excluded value for releasing the binary value "0".

According to a third aspect of the present invention there is provided a method of loading data onto a container comprising one or more Destructive Read Memory (DeRM) elements configured to store content, wherein each of the one or more DeRM elements are configured such that the content stored by each of the one or more DeRM elements is greater than the content revealed when each of the one or more DeRM elements are destructively read by challenging each of the one or more DeRM elements with a part or all of the content to be written.

In one alternative each of the one or more DeRM elements is configured to have valid content written into it by repeatedly challenging each of the one or more DeRM elements with a part or all of the content to be written until all of the content has been written.

In one alternative prior to challenging each of the one or more DeRM elements with a part or all of the content to be written each of the one or more DeRM elements are erased. In another alterative each of the one or more DeRM elements have already been erased during manufactures and cannot be erased again.

In one alternative the method of loading data onto the container comprises performing successively to each of the one or more DeRM elements the following steps:

1. erasing the DeRM element (unless the element has been erased during manufacture and cannot be erased again); and then optionally
2. challenging the DeRM element with a part or all of the content to be written; and then optionally
3. repeating step 2.

Preferably each of the one or more DeRM elements are challenged by supplying to the container the address of each of the one or more DeRM elements and (for each address) a digital value from a limited value set.

Preferably each of the one or more DeRM elements are challenged by supplying to the container the address of each of the one or more DeRM elements and for each address a digital value from a limited value set.

Preferably the address is in the same form used with conventional memory.

Preferably in the case where each of the one or more DeRM elements comprises three DeRM cells the limited value set comprises 110, 101, 011.

Preferably the container has a clock signal and the challenge is sensed at an edge of the clock signal.

The challenge preferably causes each of the one or more DeRM elements to perform two actions at the same time:

a. modify the content of the DeRM element based on the content of the DeRM element and the challenge value; and
b. output a 1-bit signal response indicating whether or not the new content is different in some way from the one that was there before the modification.

wherein if the response indicates that the new content is different, this is a differ (1) response, otherwise the response is a match (0).

In this way there is an output of each of the one or more DeRM elements.

Preferably the challenge causes each of the one or more DeRM elements itself, rather than any interface outside each of the one or more DeRM elements, to perform the two actions at the same time.

Preferably the method of loading the data onto the container facilitates the conveyance of a secret bit string from a sender to a recipient via the following steps:

1. augmenting the secret bit string with random filler equal (in information theoretic terms) to the information deficit;
2. The sender sending to the recipient over a side channel information about which of the possible challenges will reveal the secret bit string and destroy the filler (rather than destroying some of the information in the secret bit string).

According to a fourth aspect of the present invention there is provided a method of verifying that data loaded onto the container of the first aspect of the present invention by the method of the second or third aspect of the invention has not been previously accessed comprising the steps of:

1. a sender sending to a recipient a randomised confidential content contained within the container of the first aspect of the present invention, where the sender keeps a copy of that content in its local secure storage;
2. the sender establishing, via a side channel communication, that the recipient has received the container;
3. the sender revealing to the recipient, via the side channel communication, an additional piece of information regarding a subset of data from the content of the container;
4. the recipient using the additional piece of information to obtain the subset of data from the content of the container from step 3;
5. the recipient creating a summary of the subset of data obtained in step 4;
6. the recipient sending to the sender via the side channel the summary obtained in step 5.
7. the sender computing the summary on the copy of the content kept in its local secure storage.
8. the sender comparing the recipient's summary to the sender's summary and where the sender's summary is the same as the recipient's summary then the content has not been read by a third party, otherwise it has.
9. the sender sending to the recipient via the side channel the outcome of the comparison performed by the sender in step 8.
10. The recipient optionally deleting from the container any residual information it may contain about the confidential content.

Preferably the side channel is authenticated. However, the side channel does not need to be private.

In one alternative the method comprises step 2a (in between step 2 and step 3), wherein there is a preliminary communication between the sender and the recipient over the side channel to determine the detail of the additional piece of information as required.

Preferably the summary of the subset of data is an industry-standard cryptographic hash, preferably the industry-standard cryptographic hash cannot be reversed by a third party to learn a single bit of the original data from which it was obtained.

In one alternative in step 3 the additional piece of information regarding a subset of data from the content of the container; comprises a message to the recipient that contains a series of n $(A_i,X_i)$-pairs, where i=0 . . . n−1 and n is the length of the secret bit string that the sender wishes to share with the recipient at this time. The value n should be large enough to reduce the probability of correctly guessing the bit string. Usually n≳100. In each pair, $A_i$ is the address of a DeRM element and $X_i$ is the excluded value selected by the sender earlier.

In one alternative in step 4 the recipient uses the additional piece of information to obtain the subset of data from the content of the container, by, for each ith pair, challenging the container DeRM element with the address $A_i$ with one of the two remaining possible triplet values $\{L_i,H_i\}$, when $X_i$ is excluded. Which of the two challenges is used is chosen at random by the recipient. The recipient notes the output $D_i$ from the DeRM element as the challenge cycle ends. If the value $D_i$ is 0 then the challenge that was chosen will be the same as the stored information content $C_i$.

If the value $D_i$ is 1 then the challenge that was not chosen will be the same as the stored information content.

In one alternative in step 5 the summary of the subset of data obtained in step 4 comprises an industry-standard cryptographic hash of the reconstructed bit-string C In one alternative in step 6 the industry-standard cryptographic hash of the reconstructed bit-string C is communicated by the recipient back to the sender on the side channel to confirm the sharing.

In one alternative in step 9 a positive acknowledgement is sent to the recipient on the side channel if the hash is correct, or a negative acknowledgement is sent if the hash is incorrect. This does not expose the shared secret C, since cryptographic hashes are presumed to leak no information about the pre-image.

In one alternative in step 10 the recipient writes 111 to all container locations $A_i$ used in step 1 of the method, thus reliably destroying all traces of the agreed shared secret in the DeRM element. The shared secret is kept in volatile memory and remains valid until it is overwritten or until the power goes down or the method steps are repeated, whichever happens first.

In one alternative in step 3 the additional piece of information regarding a subset of data from the content of the container comprises a message to the recipient that contains a series of n $(A_i,X_i)$-pairs, where i=0 . . . n−1 and n is the length of the secret bit string that the sender wishes to share with the recipient at this time. The value n should be large enough to reduce the probability of correctly guessing the bit string. Usually n≳100. In each pair, $A_i$ is the address of a DeRM element and $X_i$ is either the excluded value, or the actual content of the DeRM element with the address $A_i$. If it is the former we will call the pair a key pair, and if the latter the choice pair. The greater the computational power the sender has at its disposal the greater the number of choice pairs m<n in the series and the more time the protocol is allowed to take. For practical purposes in a minimum length sequence n~100 it would be quite sufficient to have m~20, see below. The sender notes the position in the series of all choice pairs for use with step 3.

In one alternative in step 4 the recipient uses the additional piece of information by for each ith pair, challenging the container DeRM element with the address $A_i$ with one of the two remaining possible triplet values $\{L_i, H_i\}$, when $X_i$ is excluded. Which of the two challenges is used is chosen at random by the recipient. The recipient notes the output $D_i$ from the DeRM element as the challenge cycle ends. If the value $D_i$ is 0 then the challenge that was chosen will be the same as the stored information content $C_i$. If the value $D_i$ is 1 then the challenge that was not chosen will be the same as the stored information content.

In one alternative in step 5 the summary of the subset of data obtained in step 4 comprises an industry-standard cryptographic hash of the reconstructed bit-string C In one alternative in step 6 the industry-standard cryptographic hash of the reconstructed bit-string C is communicated by the recipient back to the sender on the side channel to confirm the sharing.

In one alternative in step 7 the sender reconstructs the bit-string $C^R$ on behalf of the recipient marking the positions that correspond to choice pairs on the original series. Bits in those positions cannot be predicted, since the recipient was sent the wrong excluded value and so the output from the DeRM upon challenging it could be 0 or 1 depending which of the two available challenges the recipient selected in each case. The sender attempts all $2^m$ combinations, typically of the order 1 million.

In one alternative in step 8 the combination from step 7 that that yields the hash value equal to the received hash value of the bit string C from step 6 is declared correct.

In one alternative in step 9 a positive acknowledgement is sent to the recipient on the side channel if a match is found, or a negative acknowledgement is sent if no match is found.

In one alternative in step 10 the recipient writes 111 to all container locations $A_i$ used in step 1 of the protocol, thus reliably destroying all traces of the agreed shared secret in the DeRM element.

The shared secret is kept in volatile memory and remains valid until it is overwritten or until the power goes down or the method steps are repeated, whichever happens first.

Definition. A watermark is a sequence of 111 and 000 values starting and ending with 111 and placed in a DeRM at consecutive addresses. Apart from the end-markers, the triplet 111 is interpreted as a binary 1 and the triplet 000 as a binary 0. The content of a watermark, interpreted as binary, is called a version value.

In one alternative in step 2a the additional communication from the sender to the recipient over the side channel; comprises a starting address. The recipient uses the starting address to obtain a version value from the content of the container by challenging (with an arbitrary triplet) the starting address of the container. If the DeRM element at the address is determined to be anything other than 111, the recipient proceeds to the next address until the first watermark is encountered and read in full. In this alternative in step 2a the additional communication from the recipient to the sender over the side channel; comprises the watermark position and the version value. The sender receives the watermark position and the version value and the sender computes the additional piece of data regarding a subset of data from the content of the container using the copy of the content kept in its local storage; by fetching the L triplets from the relevant address of the content file that it keeps in its non-volatile memory, applying a transformation $T_v$ where v is the version value of the watermark and $T_v$ is some public algorithm dependent on it, to the sequence of L triplets to obtain the sequence S' that is written in the container at those addresses. Using the binary content file (see CFP1 step 2 or CFP2 step 3 set out in the second aspect of the invention) saved in non-volatile storage previously, the sender is able to reconstruct the excluded value X' that produces that content from the sequence S', i.e. the sender is able to compute L new key pairs. The sender is also able to produce choice pairs by just taking the corresponding triplet from S'.

In one alternative in step 3 the additional piece of information regarding a subset of data from the content of the container; comprises a message to the recipient that contains a series of n $(A_i, X_i)$-pairs, where i=0 . . . n−1 and each pair is either a key pair or a choice pair. The value n should be large enough to reduce the probability of correctly guessing the bit string. Usually $n \gtrsim 100$. In each pair, $A_i$ is the address of a DeRM element and $X_i$ is either the excluded value, in the case of a key pair, or the actual content of the DeRM element with the address $A_i$ in the case of a choice pair. Since all recipients of containers receive generally different content, one may choose not to require choice pairs under the assumed threat model at all. We recognise that more aggressive threat models may exist under which the use of choice pairs might still be justified.

In one alternative in step 4 for each ith pair, the recipient challenges the container DeRM element with the address $A_i$ with one of the two remaining possible triplet values $\{L_i, H_i\}$, when $X_i$ is excluded. Which of the two challenges is used is chosen at random by the recipient. The recipient notes the output $D_i$ from the DeRM element as the challenge cycle ends. If the value $D_i$ is 1 then the challenge that was not chosen will be the same as the stored information content. If the value $D_i$ is 0 then either the challenge that was chosen will be the same as the stored information content $C_i$, or the stored content is 111. To distinguish these cases, the recipient challenges the DeRM element a second time, with the other triplet value from the pair $L_i$, H; and notes the output $D_i$ from the DeRM element as the second challenge ends. If this value $D_i$ is 1 then the first challenge will be the same as the stored information content. If this value $D_i$ is 0 then the stored content is 111. If a watermark is detected before the L triplets have been read, the protocol fails.

In one alternative in step 5 the summary of the subset of data obtained in step 4 comprises an industry-standard cryptographic hash of the reconstructed bit-string C In one alternative in step 6 the cryptographic hash of the bit-string C is communicated from the recipient back to the sender on the side channel to confirm the sharing.

In one alternative in step 7 the sender reconstructs the bit-string $C^R$ on behalf of the recipient marking the positions (if any) that correspond to choice pairs on the original series. Bits in those positions cannot be predicted, since the recipient was sent the wrong excluded value and so the output from the DeRM upon challenging it could be 0 or 1 depending which of the two available challenges the recipient selected in each case. The sender attempts all $2^m$ combinations.

In one alternative in step 8 the combination that yields the hash value equal to the received hash of the bit string C is declared correct. (If choice pairs are not being used then m=0 and there is only one bit-string to check.)

In one alternative in step 9 positive acknowledgement is sent to the recipient on the side channel if a match is found, or a negative acknowledgement is sent if no match is found.

In one alternative in step 10 the recipient writes 111 to all container locations $A_i$ used in step 1 of the protocol, thus reliably destroying all traces of the agreed shared secret in the DeRM element. The shared secret is kept in volatile memory and remains valid until it is overwritten or until the power goes down or the method steps are repeated, whichever happens first.

Preferably the summary of the subset of data is an industry-standard cryptographic hash, preferably the industry-standard cryptographic hash cannot be reversed by a third party to learn a single bit of the original data that it was obtained from.

The present invention also provides a method of obtaining evidence of tamper by a third-party of a physical container carrying digital data between a sender and a recipient, where the evidence is reliably obtained in automatic mode solely by sending and receiving digital signals to the container using its signal terminals. Tampering is evidenced by a mis-match at step 8 of the general method above.

The container and its utility depend solely on the two fundamental properties of destructive read and information deficit as set out here. The destructive read property means that an interceptor cannot read the content of the container without the possibility of changing the content in the process in a way that destroys information. The information deficit property means that information content stored by each of the one or more DeRM elements is greater than the information content revealed when each of the one or more DeRM elements are destructively read. This means an interceptor cannot read any significant part of the content of the container without destroying more information than the reading reveals. After the content has been read, and thus changed, any attempt to restore the content to the state it was in prior to the reading is prevented by the information deficit property: to restore the content, the interceptor requires all information that was stored in the container by the sender, and this cannot be extracted without the sender first supplying the part that would be destroyed by reading.

One application of the invention is for sharing random content in order for that content to be used as a shared key, including the use of one-time pad, for further confidential exchanges between the sender and recipient on open channels. In such a use case, failure of Step 8 does not expose confidential data. If Step 8 succeeds, this guarantees that no third party has seen the content to be shared.

According to a fifth aspect of the present invention there is provided a method of verifying that data loaded onto a container comprising one or more Destructive Read Memory (DeRM) elements configured to store content, wherein each of the one or more DeRM elements are configured such that the content stored by each of the one or more DeRM elements is greater than the content revealed when each of the one or more DeRM elements are destructively read by challenging each of the one or more DeRM elements with a part or all of the content to be written has not been previously accessed comprising the steps of:

1. a sender sending to a recipient a randomised confidential content contained within the container of the first aspect of the present invention, where the sender keeps a copy of that content in its local secure storage;
2. the sender establishing, via a side channel communication, that the recipient has received the container;
3. the sender revealing to the recipient, via the side channel communication, an additional piece of information regarding a subset of data from the content of the container;
4. the recipient using the additional piece of information to obtain the subset of data from the content of the container from step 3;
5. the recipient creating a summary of the subset of data obtained in step 4;
6. the recipient sending to the sender via the side channel the summary obtained in step 5.
7. the sender computing the summary on the copy of the content kept in its local secure storage.
8. the sender comparing the recipient's summary to the sender's summary and where the sender's summary is the same as the recipient's summary then the content has not been read by a third party, otherwise it has.
9. the sender sending to the recipient via the side channel the outcome of the comparison performed by the sender in step 8.

10. The recipient optionally deleting from the container any residual information it may contain about the confidential content.

Preferably the side channel is authenticated. However, the side channel does not need to be private.

In one alternative the method comprises step 2a (in between step 2 and step 3), wherein there is a preliminary communication between the sender and the recipient over the side channel to determine the detail of the additional piece of information as required.

Preferably the summary of the subset of data is an industry-standard cryptographic hash, preferably the industry-standard cryptographic hash cannot be reversed by a third party to learn a single bit of the original data from which it was obtained.

BRIEF DESCRIPTION OF THE DRAWINGS

The invention will now be described, by way of example only, with reference to the accompanying drawings in which:—

DESCRIPTION OF THE PREFERRED EMBODIMENTS

Figure 1:
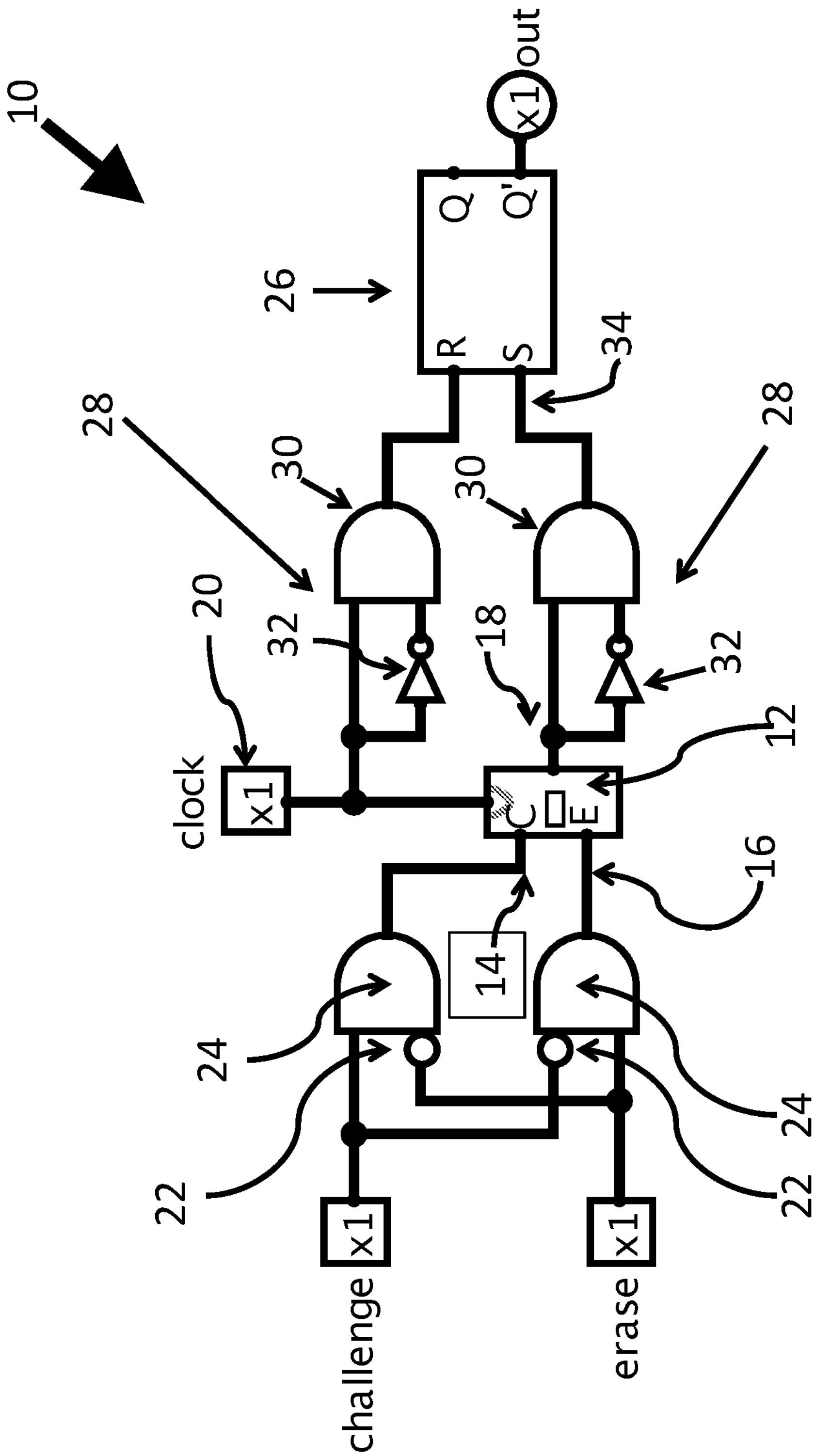
FIG. 1 illustrates a single bit DeRM cell.

Embodiments of the present invention are described below by way of example only. These examples represent the best ways of putting the invention into practice that are currently known to the applicant although they are not the only ways in which this could be achieved.

The present invention relates to a method and implementation to obtain a probabilistically tamper proof (PTP) digital container of data.

Whilst the present invention does not rely on the presence of any physical protection on a level above that of individual storage bits, such as hard-to-forge destructible wrapping, a hard shell, etc. it can be used in conjunction with any combination of such physical protections.

The present invention ensures that if there is any tampering with the container, i.e. any attempts by a third-party to read any sufficiently large subset of the data that has been stored on the container, then such attempts will be detected by the sender and/or recipient when the sender and recipient engage in a post-delivery verification protocol.

A Destructive-Read Memory (DeRM) container is a storage device capable of storing data without the need for any external power for a period of time longer than the maximum time that would be needed to transport the container from a sender to a recipient. The container has one or more DeRM elements and each DeRM element contains k enumerated DeRM cells, each of which are able to store one bit of data. k is a small integer number, in most cases between 3 and 8. In one embodiment of the invention, k=3.

The present invention utilises a DeRM container as technology for producing a fully-digital PTP container.

There are provided one or more DeRM elements each comprising one or more DeRM cells, and at any time individually each of the one or more DeRM elements is found in one of the following states:

erased, when the content of all constituent DeRM cells is 0;

filled, when the content of the constituent DeRM cells is a mixture of 1's and 0's.

read, when the content of all constituent DeRM cells is 1.

Valid content for a filled DeRM element may exclude certain combinations of DeRM cell values in order to facilitate maintaining the information deficit. For example, in an embodiment with k=3, the value combinations 001, 010, and 100 may be excluded in order to ensure that 1. Any challenge to a DeRM element that results in a "differ" response destroys all the information contained in the DeRM element; this blocks an interceptor from extracting this information gradually via a sequence of challenges, such as 001, then 010, then 100; and 2. Knowledge of the number of DeRM cells that change state (which could be learned by an interceptor monitoring the power draw of the container) reveals no more about the information in the DeRM element than the one bit (match or differ) revealed by the output.

A DeRM element can be erased (either at any time by the user, or possibly only once during manufacture and not again) both individually and when erasing the whole DeRM container. Failure to erase any of the DeRM elements would be a technical fault preventing the correct functioning of the DeRM container, but it would not introduce a security risk.

A DeRM element can be filled with content at any time. The preferred way of filling the DeRM element with content is after it has been erased and before any other operation is performed on it. Failure to erase the DeRM element before filling it with content would be a technical fault preventing the correct functioning of the DeRM container, but it would not introduce a security risk. Preferably the filling hardware is devised in such a way as to prevent the DeRM cells being set to an excluded combination, in order to ensure that an information deficit is maintained.

Preferably the DeRM element is filled by use of the destructive read operation, with a representation of the desired content of the DeRM element as the challenge.

A DeRM element can be destructively read at any time. This operation requires a challenge to be presented to the DeRM element. The challenge is a representation of some or all of the information that may be represented in the combination of DeRM cell values. If the challenge changes the content of the DeRM element, then the challenge is said to differ. Otherwise it is said to match. In our example instantiation with k=3, the challenge may represent a guess at the content of the DeRM cells, such as 011. Two things occur in the process of destructively reading the content of a DeRM cell:

The device senses whether the challenge differs or matches. In one alternative it may sense this electronically, for example by noting whether the floating-gate transistor (a standard building block of flash memory) opened at low or high control-gate voltage, a standard technique known in the art. However, different methods of sensing can be utilised and the method of sensing is not specific to the invention.

If the challenge differs, and the DeRM element is in the filled state, then the DeRM element is set to the read state, which means that the content of all constituent DeRM cells is set to 1. If the challenge differs and the DeRM element is in the erased state, then the DeRM element is set to the filled state with content corresponding to that represented by the challenge. In one example the output of the destructive read operation is the outcome of the challenge: match (0) or differ (1).

Preferably each DeRM element can be read repeatedly without causing a technical fault.

Use of this DeRM architecture ensures that an interceptor cannot read a significant quantity of the data stored on the DeRM container without the recipient noticing that the data has been read, since the DeRM container will be sent by the sender with all the relevant DeRM elements in the DeRM container in the filled state. Any DeRM elements that are destructively read by an interceptor using a challenge that differs will immediately transition to the read state, resulting in the irreversible destruction of some of the information in these DeRM elements, which can be detected by the recipient when they read the data stored in the DeRM elements, and the recipient can then raise the tamper alert. Tampering is evidenced by a mis-match at step 8 of the general method above.

The present invention is configured to protect each DeRM element individually and locally (for example, in terms of the physical placement of protection circuitry on the silicon die) in order to eliminate the interface attack whereby the interceptor penetrates the chip to block out the interface that controls access to memory and then reads, erases and refills the data parts of each DeRM cell. Given modern multi-layer construction of silicon chips it could be assumed that accessing individual DeRM cells directly using microelectronic probes attached to silicon would be impossible or impractical if nearly all DeRM cells are required to be read this way. Reading significantly less than 100% of the DeRM elements (say, 99%) would be ineffective for an interceptor due to the potential use of an invertible function with a bit-diffusion inverse. The sender can apply a public invertible function to a string of secret bits of a certain length, L, before placing it in the container. If the function is such that its inverse has a high degree of computational bit-diffusion, an alteration of a few bits would prevent restoration of the original content to the point of making every bit of the result unpredictable. Such diffusion is characteristic of symmetric ciphers, for example, AES. Applying AES with a publicly known key to the content before placing the content in the container would render bit-alterations disastrous to the restoration process for any interceptor. These techniques make it possible for the sender and recipient to consistently transform the content after it has been delivered, in a manner that critically depends on the validity of ALL DeRM elements' data.

Architecture

Based on the above considerations, we set out below an example implementation of a DeRM element, suitable for conveying a single secret binary value, encoded in triplet form, from the sender to the recipient.

The DeRM cell 10 illustrated in FIG. 1 is based on a 1-bit non-volatile memory cell 12, which has two inputs: Challenge 14 and Erase 16 and one output 18. The content of the DeRM cell 10 is asserted on the output 18 at all times as long as the DeRM cell 10 is supplied with power. If the input 14 is high when the clock 20 rises (transitions from low to high), the cell 12 transitions to state "1" and remains there indefinitely. The cell 12 can be erased to "0" by raising the input 16 to high before the clock 20 transitions to high. The cell 12 can be implemented using a floating-gate transistor found in flash memory. However, the present invention does not require a specific implementation; any digital structure that behaves as above can be used in implementing the present invention.

The two NOT gates 22 and AND gates 24 before the cell 12 make it impossible to challenge and erase the cell 12 simultaneously regardless of what values are asserted on the inputs 14, 16.

A latch 26 is provided which is reset by the rising (transition from low to high) of clock 20 before any input signals are able to propagate across the cell 12. The output 18 of the cell 12 is passed through a rising-edge-to-pulse converter 28 (an AND gate 30 with an invertor (such as a NOT gate) 32 between the inputs) to input 34 of the latch 26. Provided that the erase signal stays low, this results in setting the latch 26 if the memory content of the cell 12 has changed before the clock 20 rises (transitions from low to high) again. This only happens if the challenge signal is high and the content of the cell 12 is 0. Otherwise the latch 26 remains reset.

Figure 2:
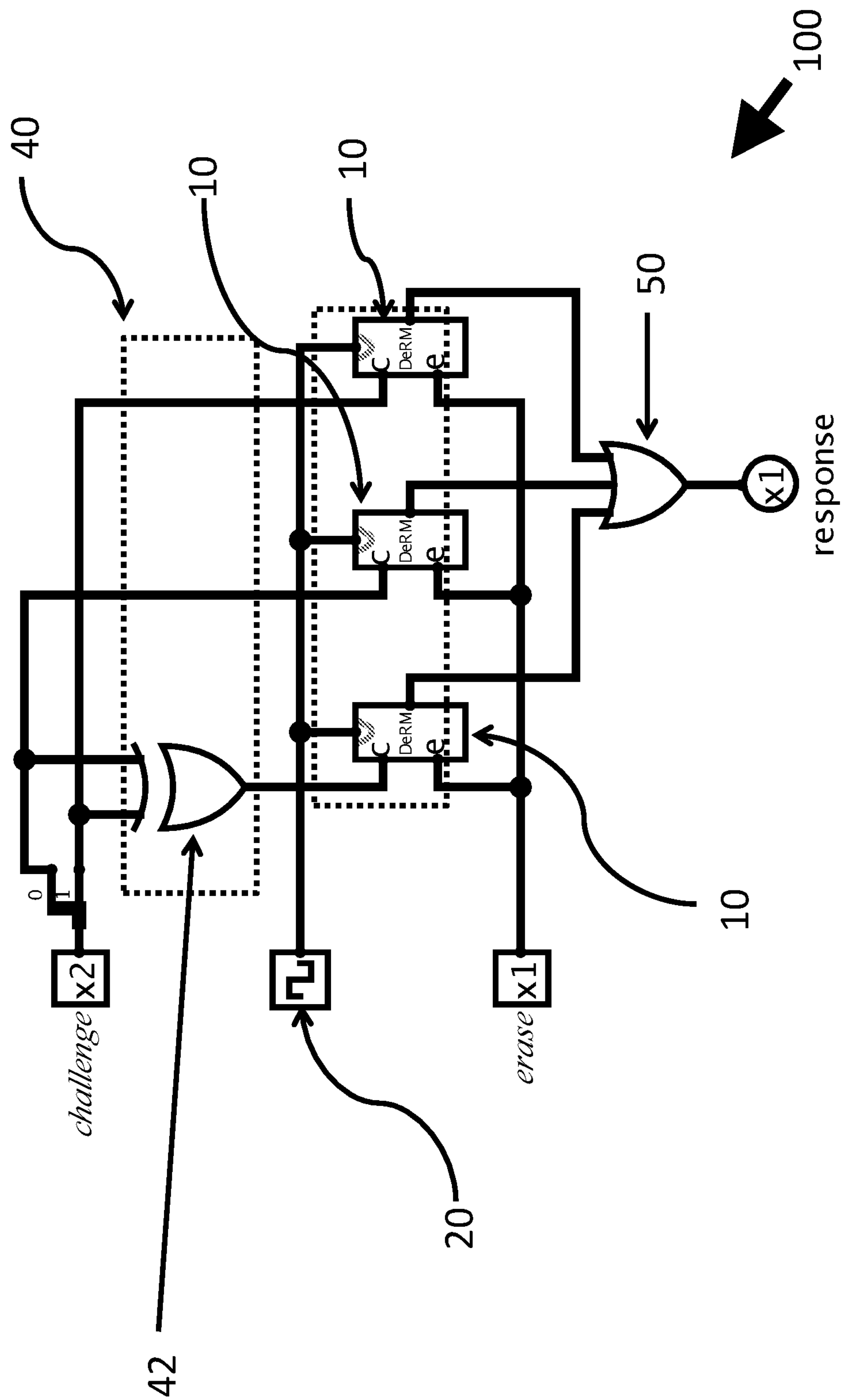
FIG. 2 illustrates a DeRM element having three DeRM cells.

FIG. 2 illustrates a DeRM element 100 having three DeRM cells 10, an encoder 40 and an aggregator 50. The encoder 40 is arranged to transform the input 2-bit challenge code into a 3-bit challenge as shown Table 1 below. The encoder 40 in the embodiment illustrated comprises an XOR Gate 42, however, the encoder 40 could comprise a different arrangement. The aggregator 50 is arranged to allow for a single output from the DeRM element 200. The aggregator 50 in the embodiment illustrated comprises an OR-gate however, aggregator 50 could comprise a different arrangement.

TABLE 1

| Challenge code | Challenge |
|---|---|
| 00 | 000 |
| 01 | 110 |
| 10 | 101 |
| 11 | 011 |

Only three values are effective: 01, 10, 11 which correspond to the three triplets being used as challenges. The fourth value, 00, represents a non-challenge, which is convenient for enabling one DeRM element in an array of DeRM elements by a standard decoder: the enabled DeRM element will see a nonzero challenge, while the rest will receive 00, which has no effect. Next, three DeRM cells 10 are driven by the encoder 40, and finally the outputs of the DeRM cells 10 are gathered into the OR gate 50 to form the output of the DeRM element 100. Notice that the state of the DeRM cells 10 carries $\log_2 3 \approx 1.58$ bits of information, but the output is strictly binary ie 1 bit. Consequently, if one act of challenging potentially changes the state of the DeRM cells 10, the output produced during the act will not convey sufficient information to determine the previous content, hence the DeRM element 100 exhibits information deficit in its response.

Figure 3:
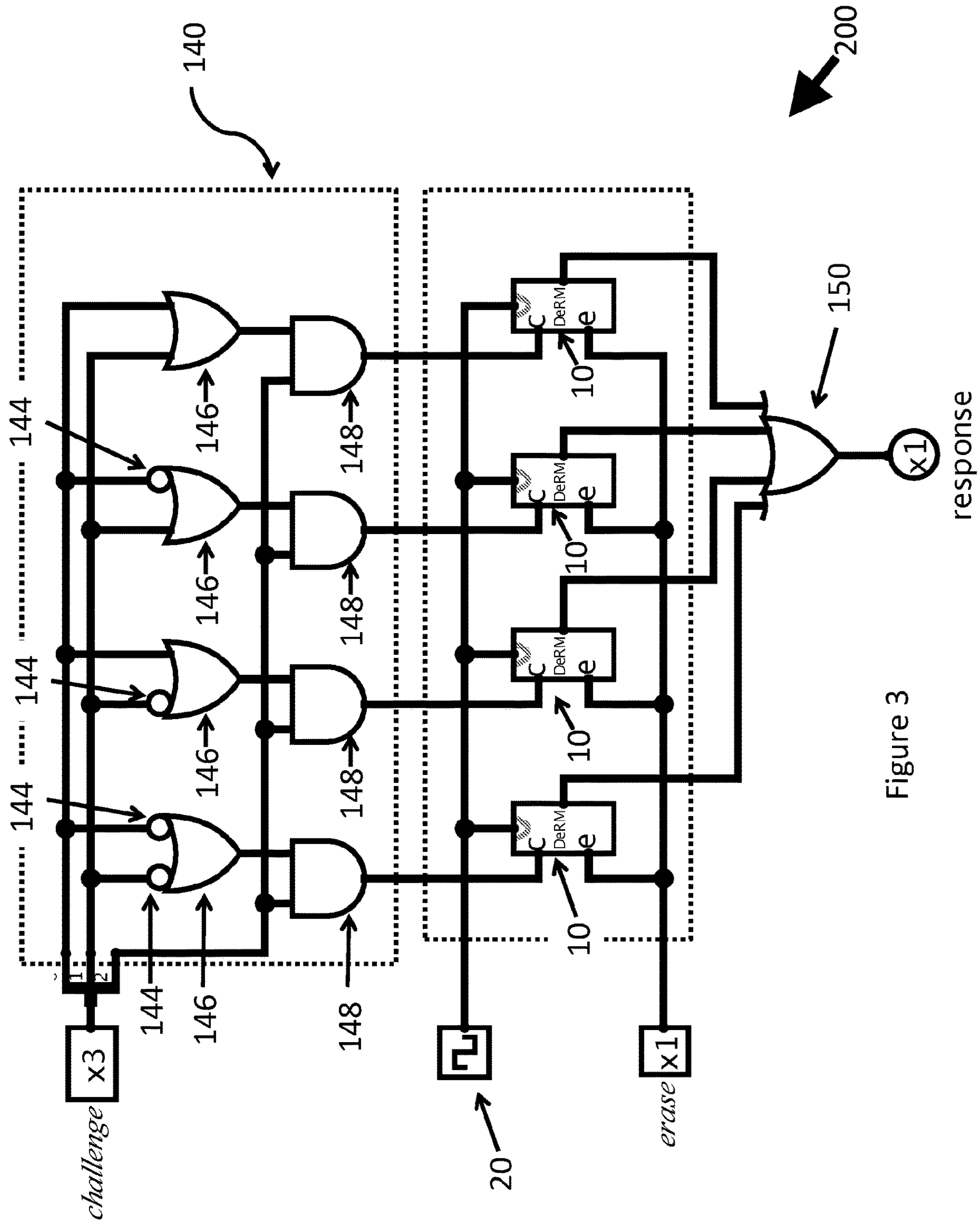
FIG. 3 illustrates a DeRM element having four DeRM cells.

FIG. 3 illustrates a DeRM element 200 having four DeRM cells 10, an encoder 140 and an aggregator 150. The encoder 140 is arranged to transform the input 3-bit challenge code into a 4-bit challenge as shown Table 2 below. The encoder 140 in the embodiment illustrated comprises an arrangement of invertors 144 (which in one alternative could be NOT gates), OR gates 146 and AND gates 148, however, the encoder 140 could comprise a different arrangement. The aggregator 150 is arranged to allow for a single output from the DeRM element 200. The aggregator 150 in the embodiment illustrated comprises an OR-gate; however, aggregator 150 could comprise a different arrangement.

TABLE 2

| Challenge code | Challenge |
|---|---|
| 0XX | 0000 |
| 100 | 1110 |

TABLE 2-continued

| Challenge code | Challenge |
|---|---|
| 101 | 1101 |
| 110 | 1011 |
| 111 | 0111 |

Only four values are effective: 100, 101, 110, 111 which correspond to the four triplets being used as challenges. The other four values, 0XX, represent a non-challenge, which is convenient for enabling one DeRM element in an array of DeRM elements by a standard decoder: the enabled DeRM element will see a nonzero challenge, while the rest will receive 000, which has no effect. Next, four DeRM cells 10 are driven by the encoder 140, and finally the outputs of the DeRM cells 10 are gathered into an the OR gate 150 to form the output of the DeRM element 200. Notice that the state of the DeRM cells 10 carries $\log_2 4=2$ bits of information, but the output is strictly binary ie 1 bit. Consequently, if one act of challenging potentially changes the state of the DeRM cells 10, the output produced during the act will not convey sufficient information to determine the previous content, hence the element exhibits information deficit in its response.

Any DeRM structure that similarly exhibits information deficit and destructive read will be acceptable as an implementation of a DeRM element for the purposes of the present invention.

According to an embodiment of the invention there is provided a Slow Release Container (SRC), which is capable of providing PTP properties.

In one embodiment of the invention the slow release container uses 3-cell DeRM elements for all bits of the content thus protecting each bit by information deficit. However, it is possible to use four or even more DeRM cells in each DeRM element.

For example in an embodiment of a case where each DeRM element contains four DeRM cells, the valid values are empty: 0 (0000), filled: 7 (0111), b (1011), d (1101), e (1110), and read: f (1111), and for each DeRM element the sender informs the recipient over the side channel of two values (for example e and 7). In this example e would represent a transmitted binary value of 0, and 7 a transmitted value of 1. A challenge with either value allows the recipient to determine which value the DeRM element contained.

Not only is it impossible for the interceptor to undetectably read a significant quantity of the content, the interceptor cannot even read it reliably without engaging with the sender. Otherwise the interceptor can read m bits of content only by confirming a guess with a probability exponentially small in m, which means that the sender and recipient can just use blocks of a length L>>m to obtain probabilistic tamper-proof protection to any desired statistical margin.

PTP properties would require a (public) bit-sensitive content post-coding, either irreversible (for example a hash) or reversible (for example encipherment with a published symmetric key), either of which being required to be the stronger the shorter the block length L. Due to its probabilistic tamper-proofness in the above sense, a slow-release DeRM container can be used for storing a large amount of secret to be released in portions from time to time, which may be a useful property for a recipient with a weak security perimeter, for example a Thing on the Internet of Things.

Swarm Protocols for Use with DeRM

Below we describe a further embodiment of DeRM container, which is especially suitable (but not exclusively so) to IoT applications. The IoT security situation is special in two regards:

1. Security of an IoT device is quite weak, to the point that it undermines the concept of stationary security perimeter. The weakness is due to limited computational resources of the device, high energy cost or both, which preclude the use of complex cryptographic algorithms with high enough frequency. In the event of attack any data contained in non-DeRM memory should be deemed compromised immediately.
2. Physical security may also be weak, for example, when the device is placed outside controlled premises in the street, on a rooftop, or in any remote or unwatched location. However, in other situations, such as smart factories, smart hospitals, etc. the physical security can be sufficient to assume that DeRM containers cannot be accessed once the device has been installed.
3. IoT devices often exist in swarms of up to thousands of individual things that share confidential information with a well-protected data Centre, but not necessarily with one another. Under such conditions it is technologically advantageous to install replicas of DeRM containers with identical or nearly identical content in all things of the swarm. This also allows the supervising agent to dynamically introduce new things at any time without expanding their database of secrets, where authorisation is given merely by installing a replica of the DeRM container with common, or lightly customised, content.

The above circumstances require a mechanism whereby:

(i) all secrets reside in a DeRM container or (in small quantities with a short life-time) in volatile memory that is erased by the attack detection infrastructure promptly and effectively.

(ii) the DeRM container supports slow release of the confidential data whereby the protocol that the Centre engages in is able to “unlock” a portion of the content of the DeRM container without exposing the rest to this or any other agent. The protocol should be designed to run repeatedly and should not be dependent on any previous outcome.

Due to the requirement of slow release the yet unused part of the container should also be unreadable. It should be impossible or very improbable to read the content anywhere near 100% correctly—whether with or without leaving a noticeable trace—for any agent without engaging in a protocol with the Centre. Recall that we presume the existence of an authenticated side channel, so the requirement to engage in a protocol automatically assures that the protocol is with a legitimate counterparty.

Architecture

The present invention uses DeRM-cell triplets in one embodiment that carry a 1-bit payload encoded as a three-bit combination as illustrated in FIG. 2. Specifically, a DeRM element in this instantiation contains three DeRM cells which are constrained electronically to only store values 000, 011, 101, 110, 111.

The three DeRM cells are destructively read at the same time and their outputs are ORed. When the DeRM element is erased, the content is set to 000 in the case of the DeRM element with three DeRM cells, and the DeRM element produces a match response on the output no matter what state the DeRM cells were in. The container is preferably a set of such DeRM elements equipped with any standard addressing mechanism that makes it possible to select a specific DeRM element for challenging or erasing.

Challenging is the process of writing the initial content into the DeRM element (after erase) or destructively examining that content (at any time after writing). Erasing is not required to be global, since the refill attack depends upon the interceptor having complete knowledge of the content to refill the container with. Note that the gate structure in FIG. 2 prevents the DeRM element from being written with a triplet containing a single 1; it is either two 1's, corresponding to one of the three information-bearing (filled) values: 011, 101, 110, or the numbers 111/000, which are the values read/empty, respectively. Notice that the value 111 cannot be written into the DeRM element in one cycle, but this can be achieved by challenging it consecutively with two out of three challenges 011, 101, 110.

Data loading into the container after erase may proceed in one of the following ways:

Container Filling Procedure CFP1

1. Before writing, the sender nominates a private excluded value: 011, 101 or 110, for each of the DeRM elements it is about to fill. The excluded value is selected at random, and the sender records its choice in some persistent storage within the sender's security perimeter. This value is excluded from the choice of values to be written into the corresponding DeRM element, leaving the other two information-bearing values as the only choices. The confidentiality of the excluded values is critical for the security properties of the proposed method, since it is the fact that they are unknown to the interceptor (as well as the legitimate recipient prior to the information release) that creates a sufficient information deficit that makes the secret in the DeRM container unreadable.
2. The content to be stored in the container is a sequence of binary values encoded in triplet form. The binary values are private, persistent, stored within the sender's security perimeter and never communicated in their original form. In one possible embodiment, the correspondence between triplet and binary values is established using a priority encoding rule: 011<101<110: whichever triplet is excluded, the lower remaining one becomes the encoding for value "0" and the higher remaining one for "1". This way the sender and the recipient have a consistent interpretation of the content when the excluded value is known. The sender encodes the content accordingly, and stores it in a temporary file, which is destroyed after completing CFP1. In another possible embodiment the correspondence between triplet and binary values is established using a cyclic encoding rule: 011→101→110→011: whichever triplet is excluded, the next triplet in the cycle becomes the encoding for value "0" and the previous triplet in the cycle becomes the encoding value for "1".
3. When the content has been encoded, the container is erased (unless the DeRM elements were erased during manufacture and cannot be erased again) and the encoded sequence of triplets is presented to it as challenges, which effectively copies the sequence of triplets to the DeRM elements at consecutive addresses of the DeRM container Container Filling Procedure CFP2

1. Before writing, the sender nominates a private encoded value: 011, 101 or 110, for each of the DeRM elements it is about to fill. The encoded value is selected at random, and the sender records its choice in some persistent storage within the sender's security perimeter. The confidentiality of the encoded values is critical for the security properties of the proposed method.
2. When the encoded values have been chosen, the container is erased (unless the DeRM elements were erased during manufacture and cannot be erased again) and the sequence of encoded values is presented to it as challenges, which effectively copies the sequence of encoded values to the DeRM elements at consecutive addresses of the DeRM container.
3. The content to be released by the container is a sequence of binary values. The binary values are private, persistent, stored within the sender's security perimeter and never communicated in their original form. It is possible that these values are not chosen by the sender until after receipt of the container has been confirmed by the recipient, for example by using the side channel. For each binary value to be released, an excluded triplet value is chosen depending on the encoded value. In one possible embodiment the correspondence between triplet and binary values is established using a cyclic encoding rule: 011→101→110→011: whichever triplet is encoded, the next triplet in the cycle becomes the excluded value for releasing the binary value "1" and the previous triplet in the cycle becomes the excluded value for releasing the binary value "0".

Protocol

The present invention enables one to share a secret because neither the interceptor nor even the recipient can read a single DeRM element reliably without knowledge of its excluded value, and the excluded value is private to the sender initially. Indeed, if the recipient applies an arbitrary valid challenge $G \neq 111$ to a DeRM element containing a triplet T, then the output D will be 0 (match) if $G=T$, since no DeRM cell will change its value. If $G \neq T$, then the output will be $D=1$ (differ) and the content will become $T=111$ at the same time. The output D is indicative of whether or not $G=T$ with 100% reliability provided that neither the content nor the challenge equals 111.

After the recipient has notified the sender of the container arrival on the side channel, the recipient will be able to read the content by engaging in Protocol A set out below. In some embodiments this protocol may be applied successively to different ranges of addresses, possibly even with long time delays (days/weeks) in between Protocol A 1. Using the side channel, the sender sends a message to the recipient that contains a series of n $(A_i, X_i)$-pairs, where $i=0 \ldots n-1$ and n is the length of the secret bit string that the sender wishes to share with the recipient at this time. The value n should be large enough to reduce the probability of correctly guessing the bit string. Usually $n \gtrsim 100$. In each pair, A is the address of a DeRM element and X is the excluded value selected by the sender earlier.
2. For each ith pair, the recipient challenges the container DeRM element with the address $A_i$ with one of the two remaining possible triplet values $\{L_i, H_i\}$, when $X_i$ is excluded. Which of the two challenges is used is chosen at random by the recipient. The recipient notes the output $D_i$ from the DeRM element as the challenge cycle ends. If the value $D_i$ is 0 then the challenge that was chosen will be the same as the stored information content $C_i$. If the value $D_i$ is 1 then the challenge that was not chosen will be the same as the stored information content.

3. The hash of the reconstructed bit-string C is communicated by the recipient back to the sender on the side channel to confirm the sharing. The sender acknowledges to the recipient on the side channel that the hash is correct, or a negative acknowledgement is sent if no match is found. This does not expose the shared secret C, since cryptographic hashes are presumed to leak no information about the pre-image.
4. The recipient writes 111 to all container locations $A_i$ used in step 1 of the protocol, thus reliably destroying all traces of the agreed shared secret in the DeRM element. The shared secret is kept in volatile memory and remains valid until it is overwritten or until the power goes down or the protocol is run again, whichever happens first.

Let us now examine Protocol A from the point of view of an interceptor. There are two possible scenarios:

1. The interceptor monitors the side channel but does not intercept the container while in transit
2. The interceptor intercepts the container and mounts a refill attack on a number of DeRM elements In the first scenario, the interceptor has no access to the container and so the knowledge of the pairs does not translate into any knowledge of the string C.

In the second scenario, the interceptor must read a number of DeRM elements correctly without knowledge of excluded values, erase the DeRM elements (unless the elements were erased during manufacture and cannot be erased again) and write back the values obtained. Alternatively the interceptor may attempt to write back the values to another DeRM container where the DeRM elements have been placed in an erased state. In either case, the best the interceptor can do is apply random challenges to a certain number of elements hoping to guess the content of the DeRM elements from the output. If the challenge delivers an output of 0, the interceptor has established the content reliably (no bit-flips inside the DeRM element signifies a correctly guessed triplet, or an output of 0 may signify an empty DeRM element 000—we discuss empty DeRM elements later, at this point we assume that the sender does not leave any DeRM elements empty). If the output is 1, one of the other two triplets is stored in the DeRM element, and now the interceptor will not know or be able to learn which one, since the content is destroyed: the DeRM element now contains 111. In this latter case the interceptor takes a guess between the two triplets other than the challenge. Adding up probabilities we get $$\frac{1}{3}+\frac{2}{3}\times\frac{1}{2}=\frac{2}{3}.$$

Clearly for a set of n DeRM elements, the probability to guess the whole set correctly is $$\left(\frac{2}{3}\right)^n.$$

For example, for n=100 this probability is $$\frac{2^{100}}{3^{100}}<3\times10^{-18}.$$

If the interceptor feels lucky despite the odds, they can mount a refill attack on a set of 100 DeRM elements by erasing them (unless the elements were erased during manufacture and cannot be erased again) and writing the guessed content back. (Alternatively the interceptor may attempt to write back the values to another DeRM container.) The interceptor then forwards the written-back container to the recipient. The attack fails if the content read by the recipient differs from the content send by the sender in at least one bit. For each bit read by the interceptor, the probability that the bit read by the recipient differs from the bit sent by the sender is ¼, and so Step 3 will fail with a probability sufficiently close to 100% due to the quality of the cryptographic hash used.

Swarm Constraints: Identical Containers

The present invention also provides a solution for an IoT situation when instead of individual devices one deals with a large collection of things of the same type, e.g. sensors, which is often called a swarm. The sender in this scenario is a non-IoT, for example a high-power server, which we will call the swarm keeper in the sequel. The keeper has to keep a copy of the whole content of the container intended for each thing in the swarm even though they are all of the same kind. If all containers contain generally different data, the storage requirement at the keeper is proportional to the size of the swarm and can become prohibitively expensive (limiting the individual container size as a consequence).

It is quite desirable to be able to use the same container data (which can run into gigabytes) with all things of a swarm, but it would require additional protocol support to prevent other things (of which some may be compromised) gaining access to secrets shared between a given thing and its swarm keeper despite the fact that the other things have access to the same container data. The present invention therefore provides Protocol B as set out below in which modifications have been made to steps 1 and 3 of Protocol A.

Protocol B.

1. Sender sends a message that contains a series of n $(A_i,X_i)$-pairs, where i=0 . . . n−1 and n is the length of the secret bit string that the sender wishes to share with the recipient at this time. The value n should be large enough to reduce the probability of correctly guessing the bit string. Usually $n\gtrsim100$. In each pair, $A_i$ is the address of a DeRM element and $X_i$ is either the excluded value, or the actual content of the DeRM element with the address $A_i$. If it is the former we will call the pair a key pair, and if the latter a choice pair. The greater the computational power the keeper has at its disposal the greater the number of choice pairs m<n in the series and the more time the protocol is allowed to take. For practical purposes in a minimum length sequence n~100 it would be quite sufficient to have m~20, see below. The sender notes the position in the series of all choice pairs for use with step 3.
2. For each ith pair, the recipient challenges the container DeRM element with the address $A_i$ with one of the two remaining possible triplet values $\{L_i, H_i\}$, when $X_i$ is excluded. Which of the two challenges is used is chosen at random by the recipient. The recipient notes the output $D_i$ from the DeRM element as the challenge cycle ends. If the value $D_i$ is 0 then the challenge that was chosen will be the same as the stored information content $C_i$. If the value $D_i$ is 1 then the challenge that was not chosen will be the same as the stored information content.
3. The cryptographic hash of the bit-string C is communicated from the recipient back to the sender on the side channel to confirm the sharing. The sender reconstructs the bit-string $C^R$ on behalf of the recipient marking the positions that correspond to choice pairs on the original series. Bits in those positions cannot be predicted, since the recipient was sent the wrong excluded value and so the output from the DeRM element. Upon challenging it could be 0 or 1 depending which of the two available challenges the recipient selected in each case. The sender attempts all $2^m$ combinations, typically of the order 1 million, and the one that yields the hash value equal to the received hash of the bit string C is declared correct. The protocol succeeds with an acknowledgement sent to the recipient on the side channel, or a negative acknowledgement is sent if no match is found.

4. The recipient writes 111 to all container locations $A_i$ used in step 1 of the protocol, thus reliably destroying all traces of the agreed shared secret in the DeRM element. The shared secret is kept in volatile memory and remains valid until it is overwritten or until the power goes down or the protocol is run again, whichever happens first.

The interceptor, who has a container with an identical message, and who wishes to learn the shared secret from the publicly available message in Step 1, faces a much greater challenge. Since the interceptor is not aware of the positions of the choice pairs in the series, it must assume that every pair is potentially a choice pair. If the value of m is public (making it somewhat easier for the attacker) it must consider all possible markings on a sequence of n bits with m bits marked, or the binomial coefficient $$\binom{n}{m} > (n-m)^m,$$

which for our example n=100, m=20 gives a lower bound of $80^{20} > 10^{38}$ strings to try to guess the bit string the recipient may have shared with the sender. Computing the cryptographic hash so many times is computationally infeasible.

The result looks a little miraculous since the interceptor and the legitimate recipient have copies of the same device at their disposal, but the fact is that the interceptor lacks two pieces of information, the random choices made by the recipient in deciding whether to test for 0 or test for 1, and the original excluded values known only to the sender, while the sender only misses the former. It is no surprise that the tasks of the interceptor and the sender are incommensurate in complexity. Indeed, if n is significantly larger than the length p of the hash, then the interceptor's problem is insoluble even given infinite computational power, as there are too many false positives, provided that at least 2p bits of the agreed secret are deleted by both sender and recipient without ever being used.

Dual-Container Attack and Watermark Defence

The above protocol is quite satisfactory for IoT applications and it exploits many strong features of the DeRM architecture. There is one weakness there, too.

Imagine two DeRM containers are stolen by an interceptor from the working things and assume that a significant amount of content in both containers is still unread. The interceptor can then challenge every DeRM element of the first container with the challenge 011, and every DeRM element of the second one with 101. If an outcome of 0 is obtained from a DeRM element of either DeRM container then the content in it is equal to the challenge. Otherwise the content is 110 since each DeRM element is expected to contain one of the three combinations. It is easy to see that if all DeRM containers store the same content, the interceptor reconstructs the content with a certainty and without having to learn the excluded values first.

We conclude that if the threat model includes a possibility of physical intrusion (and that is a factor which is not necessarily present in all IoT situations) a swarm of things requires the DeRM container content to be individualised. Yet we are not back to where we started, since the purpose of the individualisation is not to provide additional entropy as such; things can share a very large amount of true random data with their keeper already in the present arrangements. The purpose of the individualisation is to prevent juxtaposition of DeRM elements that are publicly known to hold the same content, which juxtaposition effectively removes the information deficit (by doubling the data without doubling the information) that is required to make our method work.

Consequently, it would be sufficient to only superficially individualise the data stored in the DeRM containers of swarm members, enough to make the dual-container or generally any multiple-container attack unproductive, and it is sufficient to do so without introducing additional secret data. The lack of additional secret data is important since any secrets have to be managed: stored, protected and destroyed when no longer needed (to prevent retroactive attacks). If a secret is individual (one secret per thing) the overhead for the swarm keeper is multiplied by the size of the swarm, which is undesirable.

Generally we wish to introduce a random mutation of the content at the time that it is transferred by the keeper to a thing's DeRM container without leaving any information about the mutation with the keeper. The keeper should be able to determine how the content was mutated a posteriori, in the process of interacting with the authenticated thing. We have assumed and we continue to assume that the attacker cannot break the authentication protocol and so there is a hard guarantee that the actor at the other end of the communication channel is the genuine thing it identifies itself as. This allows us to make it impossible for the multiple-container attack to succeed: provided the content in different containers is sufficiently different, the attacker cannot restore and juxtapose the original secrets without the sender helping due to the destructive read and information deficit inherent in the DeRM containers of the present invention.

Accordingly an embodiment of the invention set out below is a specific technique of individualisation that does not require sharing additional secrets with the keeper, to show that it is feasible. Other techniques can be used; the present invention provides an innovative method of preventing a multi-container attack rather than its use with one specific technique.

Observation 1. The content 111 in a DeRM element can be determined without any information from the sender and without requiring a specific challenge. Furthermore a once-challenged DeRM element can be analysed to determine with a certainty whether or not it originally contained 111 provided that the challenge itself was not 111.

Indeed, if a DeRM element of a received container is challenged for the first time with some challenge x (110, 101, or 011), and the response is 1, we say with certainty that the DeRM element did NOT contain 111. Alternatively if the response is 0, we challenge the DeRM element again with a nonzero triplet $y \neq x$, where $y \neq 111$, and if we get 0 again, the conclusion is that the original content was 111.

Observation 2. The content 000 in a DeRM element results in the outcome 0 given any challenge x.

Both observations follow from the DeRM architecture described in the Architecture section.

Definition. A watermark is a sequence of 111 and 000 values starting and ending with 111 and placed in a DeRM container at consecutive addresses. Apart from the end-markers, the triplet 111 is interpreted as a binary 1 and the triplet 000 as a binary 0.

A watermark can be placed by a copier and can be detected by the challenger (which can be the recipient or an interceptor) and read in full under any sequence of challenges applied to consecutive addresses of a DeRM container. The copier can be a separate entity that acts on behalf of the keeper and is responsible for copying the shared content supplied by it to a thing container (consecutive addresses starting with 0) before the thing is deployed as a member of a swarm. The copier does not share any secrets with the keeper other than the full DeRM content generated by the keeper, and which the copier is instructed to copy to a fresh DeRM container. The copier could be part of the keeper, but it is convenient to think of it as a separate entity inside the keeper's security perimeter.

The watermark is recognised by the recipient without prior knowledge of its location, it is encountered in the process of challenging the DeRM elements under instructions from the keeper under Protocol C. This is key to achieving our goal: avoiding the same content in all DeRM containers while using only the original secret with the whole swarm. How this may be achieved in practice is exemplified below:

Derivative Content

1. By contrast with protocols A and B the sender stores the sequence of triplets to be passed on to the copier (which would be written to the container under those protocols) rather than the excluded values. The binary content is stored as before.
2. The copier intersperses the flow of triplets supplied by the Centre with watermarks that encode a random binary number of some length (which in practice can be limited to a few tens of bits, but does not have to be of fixed length). The watermarks replace the original content so as to preserve the addresses of any unaffected triplets. The number contained in the watermark has the meaning of version. The watermarks follow at regular intervals L, with the length of the watermark itself excluded from the interval. The DeRM element with address 0 is the starting position of the first watermark.
3. Between consecutive watermarks the copier transforms the segment of the original content S using the version value. The copier obtains $S'=T_v(S)$, where v is the value of the preceding watermark and $T_v$ is some public algorithm dependent on it, and replaces S by S'. The length of S' should be guaranteed by the algorithm to be the same as S. S' is stored in the container.
4. The process continues until all triplets S' corresponding to the triplets S supplied by the Centre have been stored in the container. Note that the copier does not change the original content stored in the keeper's non-volatile storage and it does not notify the keeper of any watermarks inserted and the transformations applied except that the algorithm $T_v$ is known publicly, including to the keeper.

Protocol B is modified to obtain:

Protocol C

1. The sender informs the recipient on the side channel that the container is prepared for protocol C and gives them a starting address. The recipient starts by challenging (with an arbitrary triplet) the starting address of the container. If the DeRM element at the address is determined to be other than 111, the recipient proceeds to the next address until the first watermark is encountered and read in full. The watermark position and the version value are communicated back to the sender on the side channel.
2. The sender receives the watermark position and the version value. It fetches the L triplets from the relevant address of the content file that it keeps in its non-volatile memory. It then applies $T_v$ to the sequence of L triplets to obtain the sequence S' that the copier wrote in the container at those addresses. Using the binary content file (see CFP1 step 2 or CFP2 step 3) saved in non-volatile storage previously, the sender is able to reconstruct the excluded value X' that produces that content from the sequence S', i.e. the sender is able to compute L new key pairs. The sender is also able to produce choice pairs by just taking the corresponding triplet from S'. Sender sends a message that contains a series of n $(A_i, X_i)$-pairs, where $i=0 \ldots n-1$ and each pair is either a key pair or a choice pair. The value n should be large enough to reduce the probability of correctly guessing the bit string. Usually $n \gtrsim 100$. In each pair, $A_i$ is the address of a DeRM element and $X_i$ is either the excluded value, in the case of a key pair, or the actual content of the DeRM element with the address $A_i$ in the case of a choice pair. Since all recipients of containers receive generally different content, one may choose to not require choice pairs under the assumed threat model at all. We recognise that more aggressive threat models may exist under which the use of choice pairs might still be justified.
3. For each ith pair, the recipient challenges the container DeRM element with the address $A_i$ with one of the two remaining possible triplet values $\{L_i, H_i\}$, when $X_i$ is excluded. Which of the two challenges is used is chosen at random by the recipient. The recipient notes the output $D_i$ from the DeRM element as the challenge cycle ends. If the value $D_i$ is 1 then the challenge that was not chosen will be the same as the stored information content. If the value $D_i$ is 0 then either the challenge that was chosen will be the same as the stored information content $C_i$, or the stored content is 111. To distinguish these cases, the recipient challenges the DeRM element a second time, with the other triplet value from the pair $L_i$, H; and notes the output $D_i$ from the DeRM element as the second challenge ends. If this value $D_i$ is 1 then the first challenge will be the same as the stored information content. If this value $D_i$ is 0 then the stored content is 111. If a watermark is detected before the L triplets have been read, the protocol fails.
4. The cryptographic hash of the bit-string C is communicated from the recipient back to the sender on the side channel to confirm the sharing. The sender reconstructs the bit-string $C^R$ on behalf of the recipient marking the positions (if any) that correspond to choice pairs on the original series. Bits in those positions cannot be predicted, since the recipient was sent the wrong excluded value and so the output from the DeRM element upon challenging it could be 0 or 1 depending which of the two available challenges the recipient selected in each case. The sender attempts all $2^m$ combinations, and the one that yields the hash value equal to the received C is declared correct. (If choice pairs are not being used then m=0 and there is only one bit-string to check.) The protocol succeeds with an acknowledgement sent to the recipient over the side channel, or a negative acknowledgement is sent if no match is found.

5. The recipient writes 111 to all container locations $A_i$ used in step 1 of the protocol, thus reliably destroying all traces of the agreed shared secret in the DeRM element. The shared secret is kept in volatile memory and remains valid until it is overwritten or until the power goes down or the protocol is run again, whichever happens first.

Last we must demonstrate the existence of at least one transformation $T_v$ that thwarts the multi-container attack. The particular transformation exhibited here is non-reversible, but it is also possible to construct and use a reversible transformation $T_v$ for this purpose.

Introduce Function $$M(t, v, S) = \varepsilon(T_v(S), t),$$

where for any sequences x and y of the same length the function $\varepsilon(x,y)$ yields a sequence of the same length such that $\varepsilon(x,y)_i=1$ if $x_i=y_i$ and 0 otherwise. Notice that the sequence M is what the attacker will see if they stole the container and challenged the corresponding content with some sequence t. We are trying to minimise the mutual information between $M(t_1, v_1, S)$ and $M(t_2, v_2, S)$ for any valid $v_1 \neq v_2$, $t_1$, $t_2$ and any S.

One obvious (but not necessarily most economical) way of minimising mutual information is to use a cryptographic hash and feed it S and v. The result of such a hash is pseudorandom in the sense that it does not appreciably correlate with the argument.

Let us define the "ternary checksum" operator $\oplus$ on triplets as follows:

$$x \oplus y = \omega^{-1}(\omega(x) + \omega(y) \bmod 3)$$

where ω is a triplet to number mapping:

$$\omega(011) = 0, \omega(101) = 1, \omega(110) = 2.$$

Now let $R(S, v)=H(S\|v)$ be a cryptographic hash of the concatenation of S and v. Clearly every bit of R is assumed to be a pseudo-random function of all bits of S, which is the quality criterion of the cryptographic hash and which is another way of saying that the mutual information between any bit of S and any bit of R is vanishingly small. Next we define $T_v$ thus:

$$T_v(S)_i = R(S, v)_i \oplus S_i$$

and observe that due to the properties of cryptographic hash functions we achieve the required independence. Also note that any attempt to "crack $T_v$" would require massive trial-and-error attempts for even the simplest of hashes, and each attempt would in turn require a valid DeRM container. Realistic swarms may consist of thousands or tens of thousands of things, but a typical brute force attack on a hash involves billions of attempts, often billions of billions. This makes the proposed method secure.

We remark that there is a potential for finding a much simplified procedure here, but we also note that the complexity of the hash computation only affects the sender, in this case, the swarm keeper, and that in our threat model, the sender is powerful and is protected by its stationary security perimeter both physically and cryptographically, so even a standard hash invoked every time the sender sends a new sequence would not entail a major cost.

The invention claimed is:

1. A tamper evident container comprising one or more Destructive Read Memory (DeRM) elements configured to store content, wherein the tamper evident container comprises a physical container;

wherein each of the one or more DeRM elements comprises three or more DeRM cells, and each of the one or more DeRM elements is configured to be challenged via a challenge by supplying to the tamper evident container an address of each of the one or more DeRM elements and a digital value from a limited value set;

wherein the challenge causes each of the one or more DeRM elements to perform a single destructive read operation that:

a. updates the content of the DeRM element to a new content based on the content of the DeRM element and a challenge value; and b. outputs a 1-bit signal response based on the content of the DeRM element before the update and the challenge value, the response indicating whether or not the new content is different from the content that was there before the update;

wherein if the 1-bit signal response indicates that the new content is different, this is a differ response of a bit value one, otherwise the 1-bit signal response is a match response of a bit value zero; and wherein, for at least one challenge value, at least two possible values of the content of the DeRM element before the update result in a same new content value and response such that content revealed by the challenge is less than the content stored by the DeRM element thereby irreversibly destroying the content of the DeRM element before the update.

2. A tamper evident container as claimed in claim 1 wherein the tamper evident container is configured to carry or transport digital data between a sender and a recipient.

3. A tamper evident container as claimed in claim 1 wherein the tamper evident container comprises an array of a plurality of DeRM elements.

4. A tamper evident container as claimed in claim 1 wherein the limited value set comprises 110, 101, 011.

5. A tamper evident container as claimed claim 1 wherein each of the one or more DeRM elements is configured to have valid content written into it by challenging the DeRM element with a part or all of the content to be written.

6. A tamper evident container as claimed in claim 1 wherein each of the one or more DeRM elements is configured to have valid content written into it by repeatedly challenging the DeRM element with a part or all of the content to be written until all of the content has been written.

7. A tamper evident container as claimed in claim 1 wherein prior to challenging the DeRM element with a part or all of the content to be written the DeRM element is erased.

8. A tamper evident container as claimed in claim 1 wherein each of the one or more DeRM elements are configured that the content of the DeRM element cannot be read other than by challenging it.

9. A tamper evident container as claimed in claim 1 wherein each of the one or more DeRM elements are configured to output the 1-bit signal response only when challenged.

10. A tamper evident container as claimed in claim 1 wherein each of the one or more DeRM elements are configured to output no information when challenged other than the 1-bit signal response.

11. A tamper evident container as claimed in claim 1 wherein a destructive read reveals that one of the DeRM cells of which the DeRM element is comprised has changed state, but does not disclose which DeRM cell this was.

12. A method of loading data onto a tamper evident container, the method comprising:

challenging one or more DeRM elements with a part or all of content to be written by supplying to the tamper evident container an address of each of the one or more DeRM elements and a digital value from a limited value set;

wherein the tamper evident container comprises a physical container;

wherein each of the one or more DeRM elements comprises three or more DeRM cells;

wherein the challenging causes each of the one or more DeRM elements to perform a single destructive read operation that:

a. updates content of the DeRM element to a new content based on the content of the DeRM element and a challenge value; and b. outputs a 1-bit signal response based on the content of the DeRM element before the update and the challenge value, the response indicating whether or not the new content is from the content that was there before the update;

wherein if the 1-bit signal response indicates that the new content is different, this is a differ response of a bit value one, otherwise the 1-bit signal response is a match response of a bit value zero; and wherein, for at least one challenge value, at least two possible values of the content of the DeRM element before the update result in a same new content value and response such that content revealed by the challenging is less than the content stored by the DeRM element thereby irreversibly destroying the content of the DeRM element before the update.

13. A method as claimed in claim 12 further comprising verifying that data loaded onto the tamper evident container has not been previously accessed, wherein the verifying comprises the steps of:

1. A sender sending to a recipient a randomised confidential content contained within the tamper evident container, where the sender keeps a copy of that content in its local secure storage;
2. the sender revealing to the recipient, via a side channel communication, an additional piece of information regarding a subset of data from the content of the tamper evident container;
3. the recipient using the additional piece of information to obtain the subset of data from the content of the tamper evident container from step 2;
4. the recipient creating a summary of the subset of data obtained in step 3;
5. the recipient sending to the sender via the side channel the summary obtained in step 4;
6. the sender computing the summary on the copy of the content kept in its local secure storage;
7. the sender comparing the recipient's summary to the sender's summary and where the sender's summary is the same as the recipient's summary then the content has not been read by a third party, otherwise it has; and
8. the sender sending to the recipient via the side channel the outcome of the comparison performed by the sender in step 7.

14. A method as claimed in claim 13 further comprising sending a preliminary communication between the sender and the recipient over the side channel to determine detail of the additional piece of information, the preliminary communication sent before step 2.

15. A method as claimed in claim 13 wherein the summary of the subset of data is an industry-standard cryptographic hash.

16. A method as claimed in claim 12 further comprising verifying that data loaded onto the tamper evident container has not been previously accessed, wherein the verifying comprises the steps of:

1. A sender sending to a recipient a randomised confidential content contained within the tamper evident container, where the sender keeps a copy of that content in its local secure storage;
2. the sender revealing to the recipient, via a side channel communication, an additional piece of information regarding a subset of data from the content of the tamper evident container;
3. the recipient using the additional piece of information to obtain the subset of data from the content of the tamper evident container from step 2;
4. the recipient creating a summary of the subset of data obtained in step 3;
5. the recipient sending to the sender via the side channel the summary obtained in step 4;
6. the sender computing the summary on the copy of the content kept in its local secure storage;
7. the sender comparing the recipient's summary to the sender's summary and where the sender's summary is the same as the recipient's summary then the content has not been read by a third party, otherwise it has;
8. the sender sending to the recipient via the side channel the outcome of the comparison performed by the sender in step 7; and
9. the recipient deleting from the tamper evident container any residual information it may contain about the randomised confidential content.

17. A method of loading data onto a container comprising one or more Destructive Read Memory (DeRM) elements configured to store content, the method comprising:

challenging each of the one or more DeRM elements via a challenge by supplying to the container the address of each of the one or more DeRM elements and a digital value from a limited value set, wherein each of the one or more DeRM elements comprises three or more DeRM cells;

wherein the challenge causes each of the one or more DeRM elements to perform a single destructive read operation that:

a. updates the content of the DeRM element to new content based on the content of the DeRM element and a challenge value; and b. outputs a 1-bit signal response indicating whether or not the new content is different from the content that was there before the update; and wherein if the 1-bit response indicates that the new content is different, this is a differ response of a bit value one, otherwise the 1-bit response is a match response of a bit value zero; and wherein, for at least one challenge value, at least two possible values of the content of the DeRM element before the update result in a same new content value and response such that content revealed by the challenge is less than the content stored by the DeRM element thereby irreversibly destroying the content of the DeRM element before the update.

18. A method as claimed in claim 17 wherein each of the one or more DeRM elements is configured to have valid content written into it by repeatedly challenging each of the DeRM elements with a part or all of the content to be written until all of the content has been written.

19. A method as claimed in claim 17 further comprising erasing each of the one or more DeRM elements prior to the challenging.

20. A method as claimed in claim 17 wherein the limited value set comprises 110, 101, 011.

* * * * *